United States Patent
Vargantwar et al.

(10) Patent No.: US 8,565,082 B1
(45) Date of Patent: Oct. 22, 2013

(54) METHOD AND SYSTEM FOR SELECTING CYCLIC PREFIX LENGTH BASED ON ACCESS POINT LOAD

(75) Inventors: Sachin R. Vargantwar, Overland Park, KS (US); Manoj Shetty, Overland Park, KS (US); Deveshkumar N. Rai, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 325 days.

(21) Appl. No.: 13/072,480

(22) Filed: Mar. 25, 2011

(51) Int. Cl.
  *H04J 11/00* (2006.01)
(52) U.S. Cl.
  USPC .......................................... 370/230; 370/343
(58) Field of Classification Search
  USPC .......... 370/230, 338, 342, 343, 468, 470, 476
  See application file for complete search history.

(56) References Cited

U.S. PATENT DOCUMENTS

| | | | |
|---|---|---|---|
| 8,422,577 | B1 | 4/2013 | Shetty et al. |
| 2006/0013325 | A1 | 1/2006 | Agrawal et al. |
| 2007/0002726 | A1 | 1/2007 | Zangi |
| 2007/0133695 | A1* | 6/2007 | Kotzin ........................... 375/260 |
| 2008/0002645 | A1 | 1/2008 | Seki et al. |
| 2008/0043613 | A1 | 2/2008 | Yang et al. |
| 2009/0196190 | A1 | 8/2009 | Li et al. |
| 2009/0232236 | A1 | 9/2009 | Yamamoto et al. |
| 2009/0279626 | A1 | 11/2009 | Wang |
| 2010/0303168 | A1 | 12/2010 | Xia |
| 2011/0201334 | A1* | 8/2011 | Rosenqvist et al. ........... 455/436 |

OTHER PUBLICATIONS

Kambiz Homayounfar et al., "CQI Measurement and Reporting in LTE: A New Framework," PHYBIT, Inc., 2009.
Jim Zyren, "Overview of the 3GPP Long Term Evolution Physical Layer," White Paper, Freescale Semiconductor, Inc., 2007.
Antonis Hontzeas, "Long Term Evolution," 2009.
Ericsson, "LTE—an introduction," White Paper, 284 23-3124 Uen Rev B, Jun. 2009.
Motorola, Inc., "Long Term Evolution (LTE): A Technical Overview," Technical White Paper, 2007.
Charan Langton, "Orthogonal Frequency Division Multiplex (OFDM) Tutorial," 2004.
Stefania Sesia et al., LTE—The UMTS Long Term Evolution: from Theory to Practice, Chapter 5: "Orthogonal Frequency Division Multiple Access (OFDMA)," pp. 113-134, John Wiley & Sons, Ltd, 2009.
3rd Generation Partnership Project, "Technical Specification Group Radio Access Network; Evolved Universal Terrestrial Radio Access (E-UTRA); Physical layer procedures,(Release 8)," 3GPP TS 36.213 V8.5.0, 2008.
Jean Armstrong, "OFDM—Orthogonal Frequency Division Multiplexing," La Trobe University, 2002.
"Method and System for Selecting Cyclic Prefix Length Based on Signal Quality Reports," U.S. Appl. No. 13/072,420, filed Mar. 25, 2011.

* cited by examiner

*Primary Examiner* — Brian D Nguyen

(57) ABSTRACT

During a first time interval, an access point transmits orthogonal frequency division multiplexing (OFDM) signals using a first cyclic prefix length. The access point selects a second cyclic prefix length based, at least in part, on the load of the access point. The access point transmits OFDM signals using the second cyclic prefix length during a second time interval. The load of the access point may be determined based on the amount of downlink data being buffered in the access point for transmission to one or more user devices.

15 Claims, 3 Drawing Sheets

METHOD AND SYSTEM FOR SELECTING CYCLIC PREFIX LENGTH BASED ON ACCESS POINT LOAD

BACKGROUND

Orthogonal frequency division multiplexing (OFDM) is used in wireless communication systems, such as IEEE 802.11 (WiFi) systems, IEEE 802.16 (WiMAX) systems, and systems that use the Long Term Evolution (LTE) specifications of the Universal Mobile Telecommunications System (UMTS). In the OFDM approach, data is organized into symbols that are used to modulate a plurality of sub-carriers. The sub-carriers are spaced apart in frequency by a subcarrier spacing, $\Delta f$.

In order to reduce or eliminate inter-symbol interference (ISI) that may be caused by multipath propagation, a portion of each symbol (typically the final portion) is duplicated and appended to the beginning of the symbol as a cyclic prefix. This approach can be effective, provided that the length of the cyclic prefix, $T_{CP}$, is greater than the delay spread, $T_D$, that is caused by multipath propagation. Thus, a longer cyclic prefix can beneficially make an OFDM signal more robust against multipath propagation. However, this benefit comes at a cost. Because the cyclic prefix is redundant information, a longer cyclic prefix for a given OFDM symbol duration results in more overhead and less spectral efficiency. Although it is possible to mitigate the inefficiency caused by a longer cyclic prefix by increasing the OFDM symbol duration, $T_U$, this requires a reduction in the subcarrier spacing by the relationship $\Delta f=1/T_U$. A smaller subcarrier spacing, however, makes the OFDM signals more sensitive to frequency offsets, such as Doppler shifts, which can cause inter-carrier interference (ICI).

To balance these competing considerations, LTE specifications define three different parameterizations with three different cyclic prefix lengths for downlink communications. The basic parameterization uses a cyclic prefix length of approximately 5 microseconds. In addition, LTE specifications define a parameterization with an extended cyclic prefix length of approximately 17 microseconds. This extended cyclic prefix length is intended for larger cells (such as cells used in rural areas), which may be expected to have a larger delay spread. LTE also supports a multi-cell broadcast transmission mode with a cyclic prefix length of approximately 33 microseconds.

OVERVIEW

In a first principal aspect, an exemplary embodiment provides a method of adjusting a length of a cyclic prefix used in orthogonal frequency division multiplexing (OFDM) communications. OFDM signals using a first cyclic prefix length are transmitted through an access point. A load of the access point is determined. A second cyclic prefix length is selected based, at least in part, on the load. OFDM signals using the second cyclic prefix length are then transmitted through the access point.

In a second principal aspect, an exemplary embodiment provides a method of adjusting a length of a cyclic prefix used in orthogonal frequency division multiplexing (OFDM) communications. During a first time interval, an access point transmits OFDM signals using a first cyclic prefix length. An occupancy of a downlink buffer associated with the access point is determined, wherein the access point is configured to transmit data buffered in the downlink buffer to one or more user devices. A second cyclic prefix length is selected based, at least in part, on the occupancy of the downlink buffer. During a second time interval, the access point transmits OFDM signals using the second cyclic prefix length.

In a third principal aspect, an exemplary embodiment provides a system comprising: (a) a radio frequency (RF) interface for transmitting OFDM signals to one or more user devices, wherein the OFDM signals include a cyclic prefix with a cyclic prefix length; (b) a downlink buffer configured to accumulate data for subsequent transmission to the one or more user devices; and (c) a controller coupled to the RF interface and the downlink buffer, wherein the controller is configured to adjust the cyclic prefix length based, at least in part, on an occupancy of the downlink buffer.

DETAILED DESCRIPTION OF EXEMPLARY EMBODIMENTS

1. Introduction

Figure 1:
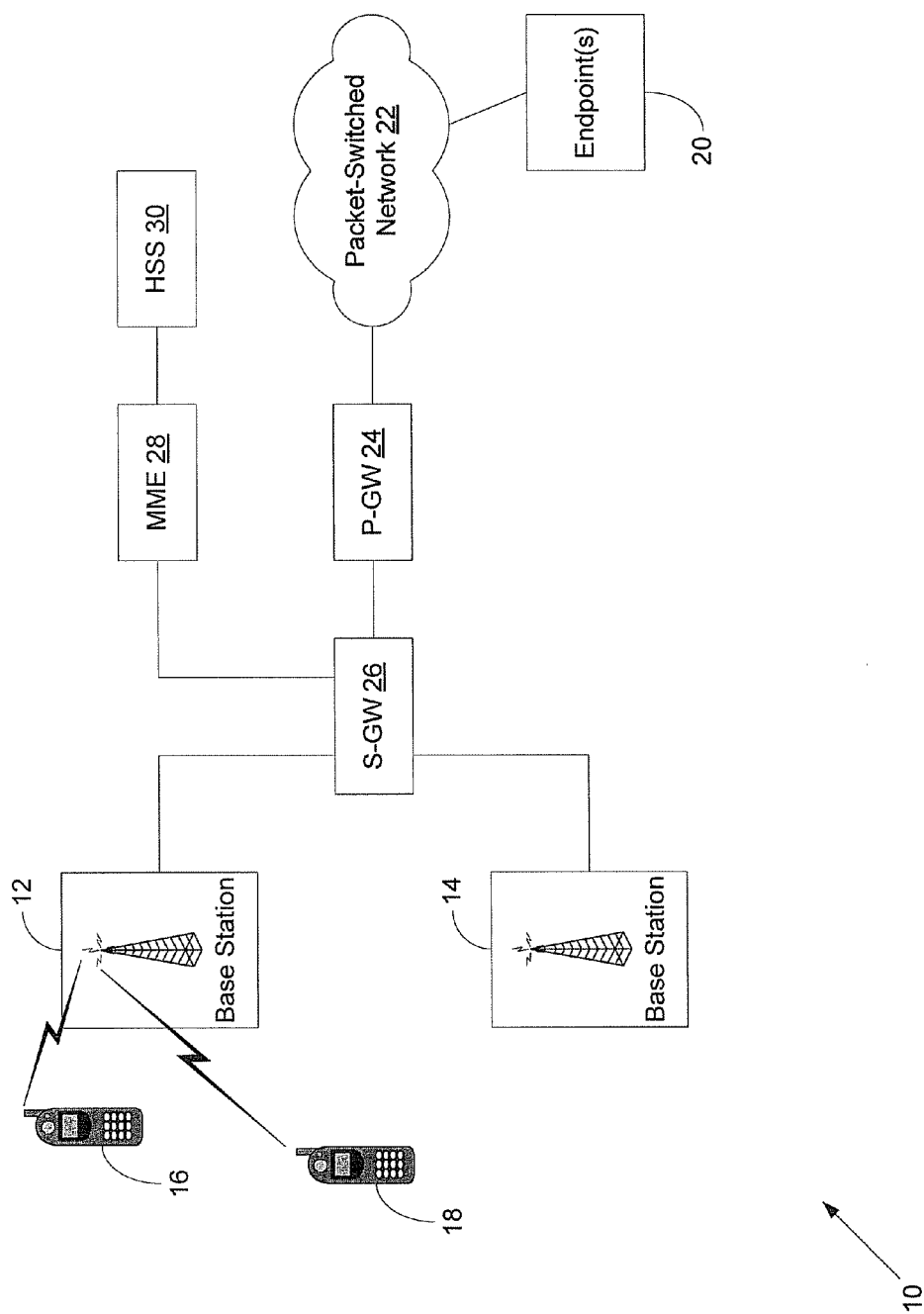
FIG. 1 is a schematic block diagram of a wireless telecommunications network, in accordance with an exemplary embodiment.

Described herein are methods and systems for adjusting a length of a cyclic prefix used in orthogonal frequency division multiplexing (OFDM) communications. In an exemplary embodiment, the cyclic prefix length used in OFDM signals transmitted through an access point is adjusted based, at least in part, on the load of the access point. Thus, a relatively longer cyclic prefix length may be used when the access point is not heavily loaded (e.g., in order to reduce inter-symbol interference), and a relatively shorter cyclic prefix length may be used when the access point is heavily loaded (e.g., in order to increase spectral efficiency). In this way, the balance between the beneficial reduction in inter-symbol interference (ISI) provided by a longer cyclic prefix and the improved spectral efficiency provided by a shorter cyclic prefix may be adjusted dynamically based on the access point's load.

The load of an access point could be determined in various ways. For example, the load could be determined based on the number of active user devices (i.e., user devices that are actively involved in communication sessions) that are being served by the access point. Alternatively, the load could be determined based on the amount of downlink data that the access point transmitted during a given time period. In yet another approach, the load of the access point could be determined based on the amount of downlink data being buffered for subsequent transmission to one or more user devices being served by the access point. The load could also be determined in other ways. In addition, the load of an access point could be determined based on a combination of one or more factors.

In an exemplary embodiment, the load of an access point is determined based on an occupancy of a downlink buffer that buffers data for subsequent transmission by the access point. Thus, during a first time interval the access point may transmit OFDM signals using a first cyclic prefix length. During the first time interval, the downlink buffer may also accumulate data for subsequent transmission to one or more user devices. At some point, the access point determines the occupancy of the downlink buffer. As one example, the access point may determine occupancy periodically. As another example, the access point may determine occupancy in response to a signal indicating that the amount of data in the downlink buffer has either exceeded or fallen below a preset level or has increased or decreased by at least a predetermined amount. The access point may then determine the occupancy based on the total amount of data in the downlink buffer, based on the fraction of the downlink buffer's total capacity that is being used to buffer data, or in some other way.

Once the load of the access point has been determined, for example, based on the occupancy of a downlink buffer associated with the access point, a second cyclic prefix length may be selected based, at least in part, on the load. To select the second cyclic prefix length, the load could be compared to a threshold value. If the load is less than the threshold value, then a default or standard cyclic prefix length could be selected as the second cyclic prefix length. If the load is greater than the threshold value, a reduced-length cyclic prefix length could be selected as the second cyclic prefix length. Alternatively, instead of one threshold value, a plurality of load ranges could be defined, with each load range being associated with a respective cyclic prefix length. The second cyclic prefix length could then be selected by identifying which load range the access point's load corresponds to and selecting the identified load range's cyclic prefix length as the second cyclic prefix length. In this way, the cyclic prefix length used by an access point may be decreased as a function of increasing load of the access point.

2. Exemplary Network Architecture

FIG. 1 is a simplified block diagram of a wireless telecommunications network 10 in which exemplary embodiments may be employed. For purposes of illustration, FIG. 1 shows a network architecture that may be used in an LTE system. It is to be understood, however, that other network architectures could be used.

Wireless telecommunications network 10 may include a plurality of wireless access points, which are exemplified in FIG. 1 by base stations 12 and 14. In LTE terminology, base stations 12 and 14 may each correspond to an eNodeB. Base stations 12 and 14 may each include a wireless coverage area within which the base station is able to wirelessly communicate with user devices. The wireless coverage areas of base stations 12 and 14 could be either overlapping or non-overlapping. Alternatively, the wireless coverage areas of base stations 12 and 14 could be co-extensive, or one wireless coverage area could be encompassed within another. Each wireless coverage area may correspond to a cell. A cell may, in turn, be subdivided into smaller wireless coverage areas, such as sectors. Although FIG. 1 shows wireless telecommunications network 10 with two base stations, it is to be understood that network 10 may include a greater or fewer number.

For purposes of illustration, base station 12 is shown in wireless communication with user devices 16 and 18. User devices 16 and 18 could be wireless telephones, wireless e-mail devices, wirelessly-equipped computers (such as handheld, tablet, or laptop computers), or other types of wireless communication devices. In an exemplary embodiment, the wireless communications between base station 12 and user devices 16 and 18 involve OFDM signals on the downlink (communications transmitted from the base station to a user device) and on the uplink (communications from a user device to the base station). Although FIG. 1 shows base station 12 serving two user devices, it is to be understood, that a base station may serve a greater or fewer number of user devices at a particular point in time.

User devices 16 and 18 could be engaged in communication sessions with one or more endpoints(s) 20 via base station 12. Endpoint(s) 20 may include, for example, one or more voice-over-packet (VoP) communication devices, e-mail servers, messaging servers, streaming media servers, gaming servers, and/or Web servers. In an exemplary embodiment, endpoint(s) 20 are communicatively coupled to a packet-switched network 22. Thus, a communication session between a user device and endpoint(s) 20 may involve the exchange of packets containing voice, video, text, or other data.

To support user devices' communications through packet-switched network 22, wireless telecommunications network 10 may include a packet gateway (P-GW) 24. For example, P-GW 24 may allocate Internet Protocol (IP) addresses for user devices. P-GW 24 may exchange packets with base stations 12 and 14 via a serving gateway (S-GW) 26. S-GW 26 may also serve as an anchor point for communication sessions when user devices move between base stations.

Wireless telecommunications network 10 may also include one or more control nodes that control communications involving user devices, such as user devices 16 and 18. For example, network 10 may include a mobility management entity (MME) 28, which controls communications between user devices and S-GW 26. MME 28 may, in turn, be communicatively coupled to a home subscriber server (HSS) 30, which stores subscriber information.

In an exemplary embodiment, base stations 12 and 14 transmit OFDM signals in which each symbol includes a cyclic prefix. The length of the cyclic prefix used by a base station may be adjusted based, at least in part, on the base station's load. Each base station may determine its own load and select a cyclic prefix based on the load. Alternatively, one or more of these functions may be performed by one or more network elements outside of the base station.

Figure 2:
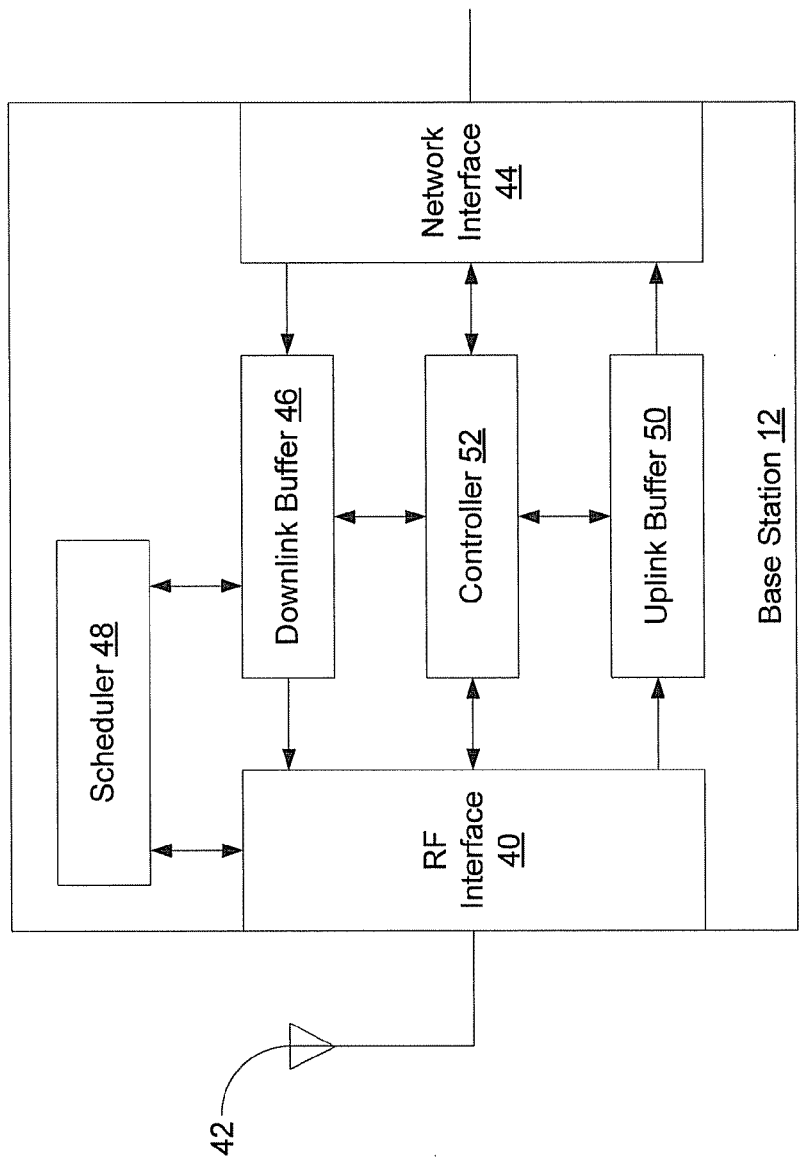
FIG. 2 is a schematic block diagram of a base station, in accordance with an exemplary embodiment.

FIG. 2 illustrates an exemplary architecture for base station 12, in which base station 12 is able to determine its load, based on the downlink data it is buffering, and to select a cyclic prefix based on the load. In this example, base station 12 includes an RF interface 40 coupled to an antenna 42. RF interface 40 is configured to transmit OFDM signals to one or more user devices and to receive OFDM signals from one or more user devices. More particularly, RF interface 40 is configured to transmit OFDM signals using a cyclic prefix having a length that can be varied. Base station 12 also includes a network interface 44 that is coupled to one or more network elements, such as S-GW 26, via a backhaul connection. Thus, network interface 44 is configured to transmit and receive data via a backhaul connection.

The data received by network interface 44 for a user device being served by base station 12 may be accumulated in a downlink buffer 46 for subsequent transmission to that user device by RF interface 40. Base station 12 may include a scheduler 48 that schedules transmissions of accumulated data in downlink buffer 46 by RF interface 40. Base station 12 may also include an uplink buffer 50 that accumulates data that RF interface 40 receives from one or more user devices for subsequent transmission by network interface 44.

A controller 52 in base station 12 may control some or all of the functions of the base station. For example, controller 52 may determine an occupancy of downlink buffer 46 and select a cyclic prefix for RF interface 40 to use based, at least in part, on the occupancy. Controller 52 may be configured to determine the occupancy of downlink buffer 46 periodically and/or in response to receiving signals regarding changes in the occupancy of downlink buffer 46 (e.g., signals from downlink buffer 46 or from scheduler 48). Once controller 52 has selected a cyclic prefix, controller 52 may control RF interface 40 to use the selected cyclic prefix when transmitting OFDM signals. Thus, controller 52 may be configured to monitor the occupancy of downlink buffer 46 (and may also monitor uplink buffer 50) and to control RF interface 40 based on the occupancy. Controller 52 may also control network interface 44, scheduler 48, and/or other functional components of base station 12.

It is to be understood that the base station architecture illustrated in FIG. 2 is exemplary only, as a base station could include additional or alternative functional components. For example, the function of scheduler 48 could be performed by controller 52. In addition, some or all of the functions of controller 52 could be performed by one or more network elements outside of base station 12.

3. Exemplary Method of Operation

Figure 3:
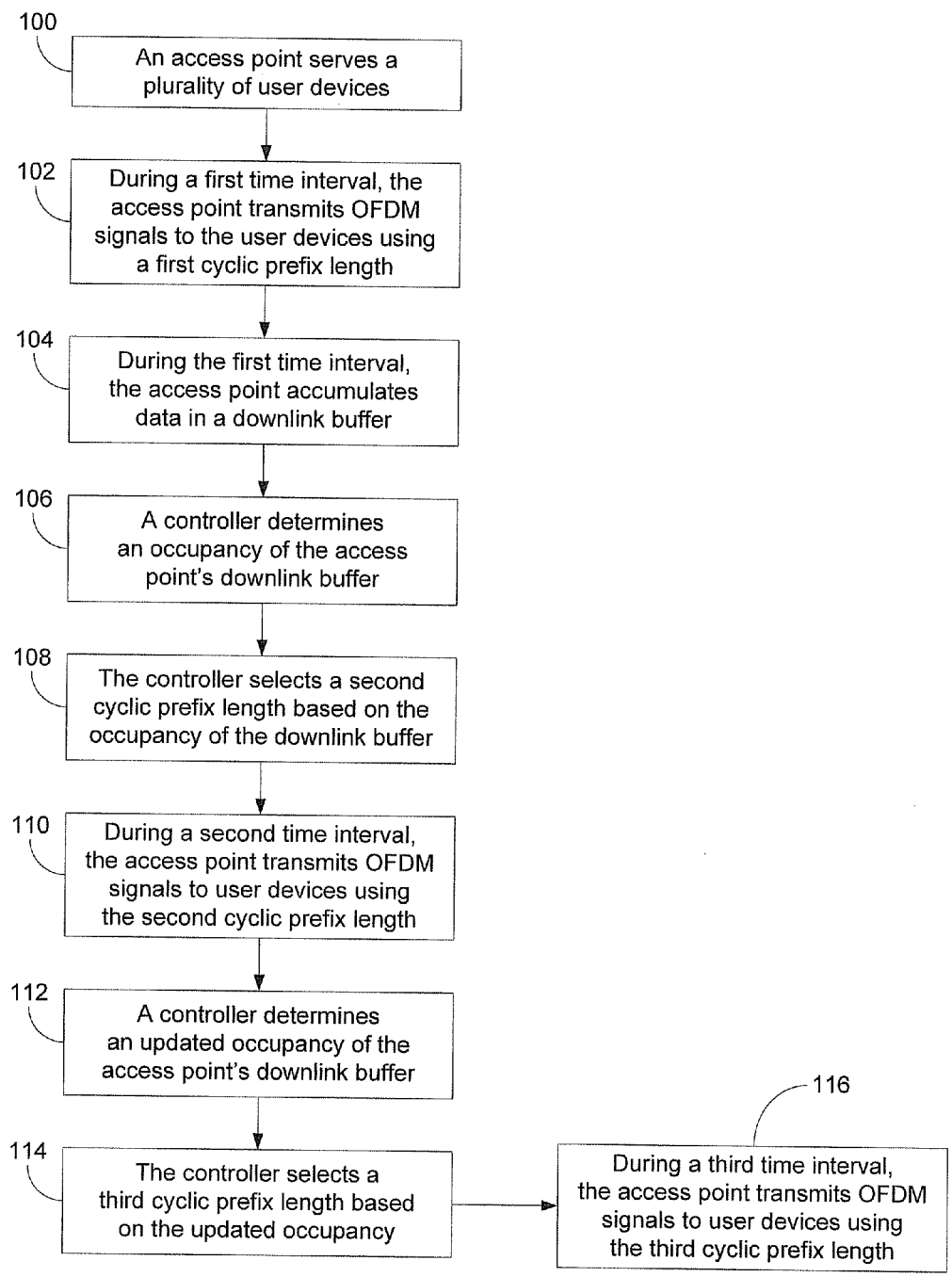
FIG. 3 is a flow chart illustrating a method of adjusting the length of a cyclic prefix used in orthogonal frequency division multiplexing (OFDM) communications, in accordance with an exemplary embodiment.

FIG. 3 is a flow chart illustrating an exemplary method of adjusting the length of a cyclic prefix used in OFDM communications. For purposes of illustration, this exemplary method is described with reference to an LTE system, such as wireless telecommunications network 10 shown in FIG. 1, and with reference to the exemplary base station architecture shown in FIG. 2. It is to be understood, however, that other base station architectures, other network architectures, and other wireless communications protocols could be used. For example, the method could also be applied to IEEE 802.11 (WiFi) and IEEE 802.16 (WiMAX) systems.

The method may begin with an access point (e.g., base station 12) serving a plurality of user devices (e.g., user devices 16 and 18), as indicated by block 100. During a first time interval, the access point transmits OFDM signals to the user devices using a first cyclic prefix length (e.g., through RF interface 40), as indicated by block 102. Also during the first time interval, the access point accumulates data in a downlink buffer (e.g., downlink buffer 46), as indicated by block 104. The data accumulated in the data buffer may include data that the access point received from the network for transmission to one or more user devices. For example, the data may include first data for a first user device (e.g., user device 16) and second data for a second user device (e.g., user device 18).

At some point, a controller determines an occupancy of the access point's downlink buffer, as indicated by block 106. The controller that performs this function could be a controller within the access point (such as controller 52). Alternatively, the controller could be a network element outside of the access point. The controller may be configured to determine the occupancy of the downlink buffer periodically. Alternatively or additionally, the controller may be configured to determine the occupancy of the downlink buffer in response to a trigger, such as receiving a signal regarding the data accumulated in the downlink buffer. For example, the controller may be informed when the amount of data accumulated in the downlink buffer exceeds a preset level.

The controller could determine the occupancy of the downlink buffer in various ways. As one example, the occupancy could be taken as the total amount of data in the downlink buffer. As another example, the occupancy could be taken as a percentage of the buffer's total capacity that is being used to buffer downlink data. In still other examples, the occupancy could include time-based considerations, such as the amount of time it would take to empty the downlink buffer based on the current downlink transmission parameters. The controller could also take into account other factors when determining the occupancy of the downlink buffer.

The controller then selects a second cyclic prefix length based on the occupancy of the downlink buffer, as indicated by block 108. The second cyclic prefix length could be shorter than the first cyclic prefix length, for example, if the occupancy of the downlink buffer has increased. The second cyclic prefix length could be longer than the first cyclic prefix length, for example, if the occupancy of the downlink buffer has decreased. The second cyclic prefix length could also be the same as the first cyclic prefix length.

To select the second cyclic prefix length, the controller may compare the occupancy to one or more threshold values. For example, the controller may select a first preset length as the second cyclic prefix length, if the occupancy is less than a threshold value, and may select a second preset length as the second cyclic prefix length, if the occupancy is greater than the threshold value. The first preset length may correspond to a standard or default cyclic prefix length that may be used under normal load conditions. The second preset length may be shorter than the first preset length, so as to allow the access point to transmit data more efficiently (i.e., with less overhead) under above-normal load conditions.

The controller could also select the second cyclic prefix length from among more than two preset lengths. For example, multiple threshold values may define three or more ranges of occupancies. Each range of occupancies may be associated with a respective cyclic prefix length, with higher occupancies being associated with shorter cyclic prefix lengths. Thus, when the controller determines that the occupancy of the downlink buffer falls within one of the predefined ranges, the controller may select the cyclic prefix length associated with that range as the second cyclic prefix length.

It is to be understood that the foregoing methods for selecting the second cyclic prefix length are exemplary only, as other methods could be used. For example, the controller may apply other types of algorithms and/or take into account other considerations (e.g., RF conditions) when selecting the second cyclic prefix length based on occupancy.

The access point may then transmit OFDM signals to user devices using the second cyclic prefix length, during a second time interval, as indicated by block 110. In an exemplary embodiment, the second time interval immediately follows the first time interval. Thus, when the access point accumulates data for user devices (e.g., user devices 16 and 18) during the first time interval, the access point may transmit some of the data to the user devices during the first time interval (i.e., in OFDM signals using the first cyclic prefix length) and may transmit some of the data during the second time interval (i.e., in OFDM signals using the second cyclic prefix length).

The user devices could become aware of the second cyclic prefix length in different ways. For example, a user device could use a "blind detection" approach for determining the cyclic prefix length. In LTE systems, a user device looks for a known Primary Synchronization Signal (PSS), which is present at Symbol 7 of either Slot 0 or Slot 10 in each frame. Once the PSS is located, the user device looks for a known Secondary Synchronization Signal (SSS) in the preceding symbol, i.e., Symbol 6. Once the user device has determined the content of Symbols 6 and 7, the user device can determine which part of these symbols represents the cyclic prefix and, hence, can determine the cyclic prefix length.

Alternatively or additionally, the access point may broadcast an overhead message that indicates the second cyclic prefix length. The access point may broadcast the overhead message during the first time interval when the access point is still using the first cyclic prefix length. In addition to indicating the second cyclic prefix length, the overhead message may also identify the beginning of the second time interval. In this way, a user device may receive the overhead message during the first time interval and prepare to receive OFDM signals using the second cyclic prefix length during the second time interval. It is also to be understood that the second cyclic prefix length could be the same as the first cyclic prefix length. In that case, the access point may forego sending an overhead message.

The method illustrated in FIG. 3 may be repeated iteratively so that the access point adjusts the cyclic prefix length that it uses in OFDM signals in responses to changing load conditions. For example, the controller may determine an updated occupancy of the access point's downlink buffer during the second time interval, as indicated by block 112. The controller may then select a third cyclic prefix length based on the updated occupancy, as indicated by block 114. The controller may determine the third cyclic prefix length in the same or similar way as was used to determine the second cyclic prefix length. The access point then transmits OFDM signals to user devices using the third cyclic prefix length, during a third time interval, as indicated by block 116.

In this way, an access point may adjust the cyclic prefix length it uses for downlink transmissions in response to changing load conditions. More particularly, by selecting a cyclic prefix length that is shorter when the access point is heavily loaded, the access point can beneficially use air interface resources more efficiently. For example, if the access point is heavily loaded because of a backlog of data in its downlink buffer, the greater efficiency provided by using a shorter cyclic prefix length may allow the access point to reduce the backlog more quickly. Although some user devices may receive OFDM signals with a non-optimal cyclic prefix length, a user device may cope with a certain amount of ISI, for example, by requesting a different modulation scheme or coding rate, by requesting retransmission of data that it receives with errors, or by handing off to a different access point.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of adjusting a length of a cyclic prefix used in orthogonal frequency division multiplexing (OFDM) communications, comprising:
transmitting, through an access point, OFDM signals using a first cyclic prefix length;
determining a load of said access point;
selecting a second cyclic prefix length based, at least in part, on said load, wherein selecting a second cyclic prefix length based, at least in part, on said load comprises (i) determining that said load corresponds to one of a plurality of load ranges to provide an identified load range, wherein each load range is associated with a respective cyclic prefix length such that higher loads are associated with shorter cyclic prefix lengths and (ii) selecting said identified load range's associated cyclic prefix length as said second cyclic prefix length; and
transmitting, through said access point, OFDM signals using said second cyclic prefix length.

2. The method of claim 1, wherein determining said load of said access point comprises determining a number of active user devices being served by said access point.

3. The method of claim 1, wherein determining said load of said access point comprises determining an amount of downlink data that said access point transmitted during a time period.

4. The method of claim 1, wherein determining said load of said access point comprises determining an amount of downlink data being buffered in said access point for transmission to one or more user devices.

5. The method of claim 1, wherein said second cyclic prefix length is longer than said first cyclic prefix length.

6. The method of claim 1, wherein said second cyclic prefix length is shorter than said first cyclic prefix length.

7. The method of claim 1, wherein said first cyclic prefix length is used during a first time interval and said second cyclic prefix length is used during a second time interval.

8. The method of claim 7, wherein said load is determined during said first time interval.

9. A method of adjusting a length of a cyclic prefix used in orthogonal frequency division multiplexing (OFDM) communications, comprising:
during a first time interval, an access point transmitting OFDM signals using a first cyclic prefix length;
determining an occupancy of a downlink buffer associated with said access point, wherein said access point is configured to transmit data buffered in said downlink buffer to one or more user devices;
selecting a second cyclic prefix length based, at least in part, on said occupancy, wherein selecting a second cyclic prefix length based, at least in part, on said occupancy comprises (i) determining that said occupancy corresponds to one of a plurality of occupancy ranges to provide an identified occupancy range, wherein each occupancy range is associated with a respective cyclic prefix length such that higher occupancies are associated with shorter cyclic prefix lengths and (ii) selecting said identified occupancy range's associated cyclic prefix length as said second cyclic prefix length; and
during a second time interval, said access point transmitting OFDM signals using said second cyclic prefix length.

10. The method of claim 9, further comprising:
accumulating data in said downlink buffer during said first time interval; and
said access point transmitting at least some of said accumulated data during said second time interval.

11. The method of claim 10, wherein accumulating data in said buffer during said first time interval comprises:
accumulating first data for a first user device and second data for a second user device.

12. The method of claim 11, wherein said access point transmitting at least some of said accumulated data during said second time interval comprises:
said access point transmitting at least some of said first data to said first user device in OFDM signals using said second cyclic prefix length; and
said access point transmitting at least some of said second data to said second user device in OFDM signals using said second cyclic prefix length.

13. A system, comprising:
a radio frequency (RF) interface for transmitting OFDM signals to one or more user devices, wherein said OFDM signals include a cyclic prefix;

a downlink buffer configured to accumulate data for subsequent transmission to said one or more user devices; and a controller coupled to said RF interface and said downlink buffer, wherein said controller is configured to determine an occupancy of said downlink buffer and to select a cyclic prefix length of said cyclic prefix by a process comprising (i) determining that said occupancy corresponds to one of a plurality of occupancy ranges to provide an identified occupancy range, wherein each occupancy range is associated with a respective cyclic prefix length such that higher occupancies are associated with shorter cyclic prefix lengths and (ii) selecting said identified occupancy range's associated cyclic prefix length as said second cyclic prefix length.

14. The system of claim 13, further comprising a scheduler coupled to said RF interface and said downlink buffer, wherein said scheduler is configured to schedule transmission of said accumulated data by said RF interface.

15. The system of claim 13, wherein said RF interface, said downlink buffer, and said controller are in a base station of a wireless telecommunications network.

\* \* \* \* \*